Jan. 27, 1953      S. FRUM      2,626,538
TEMPLE RETAINING DEVICE
Filed July 12, 1949
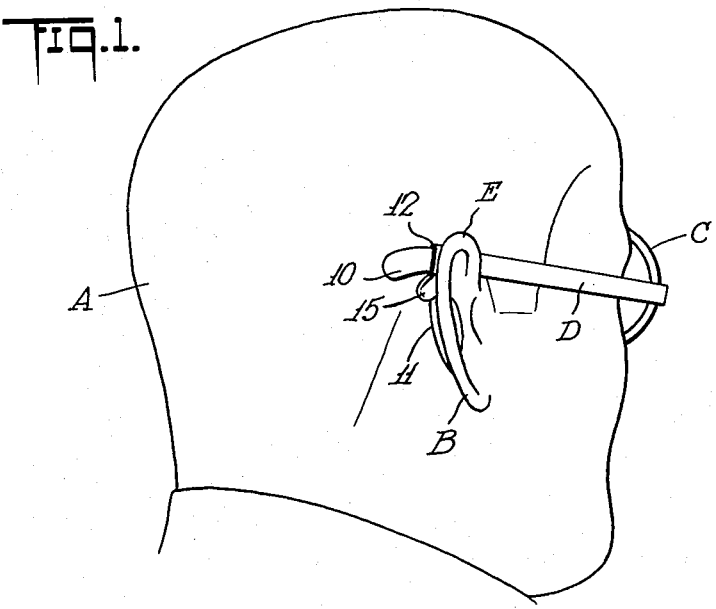
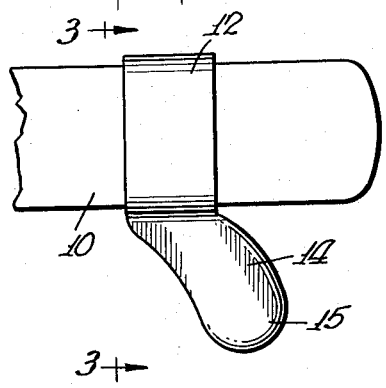
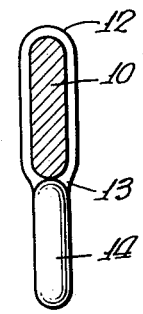
INVENTOR
*Samuel Frum*
BY
ATTORNEY Patented Jan. 27, 1953

2,626,538

UNITED STATES PATENT OFFICE 2,626,538

TEMPLE RETAINING DEVICE

Samuel Frum, New York, N. Y.

Application July 12, 1949, Serial No. 104,287

1 Claim. (Cl. 88—52)

The present invention relates to temple retaining devices and it particularly relates to devices for retaining the temples of the usual type of plastic eye shields or eye glasses to keep the glasses from sliding down upon the nose or upon the face.

With plastic temples for the usual type of eye glasses or sun shields there is a tendency for the glasses to slide down over the face, particularly when the face is moist, and it is among the objects of the present invention to provide a simple, inexpensive, readily attached and detached device which may be placed upon the temple in any desired position to hold the eye glasses or sun shields comfortably upon the face and prevent slipping forward and down thereof.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a near contact member of plastic or rubber which will be detachably clipped upon the temple members and which may be slid along the temple members to the desired distance where the eye glasses or sun shields would be most comfortably held upon the head.

In a preferred form, the ear contact member has a rubber or plastic loop to be forced over the temple member and to be slid up and down along the length of the temple member.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a rear perspective view showing the temple member applied to the temple and in desired position at the rear of the ear of the user of the eye glasses or sun shade.

Fig. 2 is a side elevational view showing the manner of application of the retention member to the side frame.

Fig. 3 is a transverse vertical sectional view upon the line 3—3 of Fig. 2.

Referring to Figs. 1, 2 and 3, the head of the user is indicated at A and the ears are indicated at B. The ordinary type of sun shields or eye glasses are indicated at C with the rearwardly extending temple members D fitting over and extending to the rear of the ear E.

The portion of the temple member 10 which extends to the rear of the back 11 of the ear E is designed to receive the loop or friction holder member 12, which may be adjustably slid along the length of the temple member D.

Integrally joined with the stretchable loop 12 at 13 is the ear contact member 14 extending rearwardly to the point 15 conforming to and contacting the rear of the ear, as indicated best in Fig. 1.

The invention as shown is subject to considerable change in respect to the attachment device 12, which may be made of metal or elastic, and the device as shown in Figs. 2 and 3 is designed to accommodate itself to a wide variety of temple members.

While there has been herein described a preferred form of the invention, it should be understood that the same may be altered in details and in relative arrangement of parts within the scope of the appended claim.

By the base of the ear is meant the portion of the contour of the exterior side of the ear where it joins the side of the head.

Having now particularly described and ascertained the nature of the invention, and in what manner the same is to be performed, what is claimed is:

In an eyeglass temple of the type extending rearwardly above and beyond the top of the base of the ear without hooking in back of the ear, the combination therewith of an adjustable rubber retention member having a stretchable short tubular portion to be stretched and telescoped upon the temple and a downwardly and rearwardly curved non-stretchable plate member having a forward edge curved concavely to conform to the upper rear surface of the base of the ear.

SAMUEL FRUM.

REFERENCES CITED

The following references are of record in the file of this patent:

UNITED STATES PATENTS

| Number | Name | Date |
|---|---|---|
| 538,151 | Bussey | Apr. 23, 1895 |
| 959,105 | Barnes | May 24, 1910 |
| 1,833,792 | Pfaus et al. | Nov. 24, 1931 |
| 2,031,771 | Grier | Feb. 25, 1936 |
| 2,229,567 | Hodgkins | Jan. 21, 1941 |
| 2,229,568 | Hodgkins | Jan. 21, 1941 |